Feb. 10, 1925.

H. R. READ

CLUTCH PEDAL AND EMERGENCY HAND BRAKE MECHANISM

Filed Sept. 30, 1921

Inventor
Henry R. Read.
By his Attorney

Patented Feb. 10, 1925.

1,525,952

UNITED STATES PATENT OFFICE.

HENRY R. READ, OF BROOKLYN, NEW YORK.

CLUTCH-PEDAL AND EMERGENCY HAND-BRAKE MECHANIS .

Application filed September 30, 1921. Serial No. 504,427.

*To all whom it may concern:*

Be it known that I, HENRY R. READ, a citizen of the United States, residing at Brooklyn, in the county of Kings and State of New York, have invented certain new and useful Improvements in Clutch-Pedal and Emergency Hand-Brake Mechanism, of which the following is a specification, reference being had therein to the accompanying drawing.

My invention relates to improvements in clutch pedal and emergency hand brake mechanism, more particularly as used in connection with a Ford automobile, and has especial reference to the clutch lever screw or bolt which bears upon the brake lever shaft cam and by which the clutch is disengaged when the emergency hand brake is operated. Heretofore it has been the custom to use an ordinary form of bolt with a locknut, the threaded end of the bolt bearing upon the cam surface, but after a short time it has been found that the bolt jams and the threads become distorted in such a manner as to prevent the withdrawal of the bolt, thus rendering the device inoperative and making it necessary to cut the bolt off in order to replace it with a new one which is subject to the same defects.

According to my preferred embodiment of the invention, I have found that by inserting the bolt upside down and by placing a ball or roller in the head of the bolt to engage the face of the cam end of the lever, this jamming and distortion is avoided.

Figure 1:
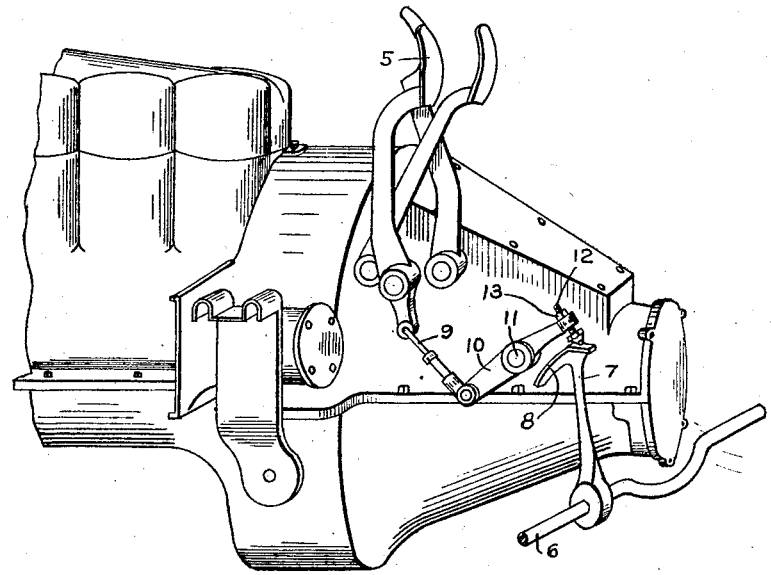
Figure 2:
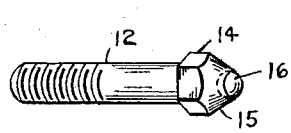
Figure 3:
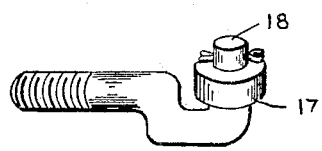
Figure 4:
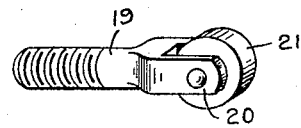

In the accompanying drawing, I have illustrated in Fig. 1 in perspective, parts being broken away, part of the transmission case and clutch chamber, etc., with the pedals and controller shaft mechanism in position, illustrating an embodiment of my invention. Fig. 2 is an enlarged detail of the bolt referred to in perspective. Fig. 3 is a similar view of a modified form of bolt, and Fig. 4 is a similar view illustrating another modification.

5 indicates the clutch pedal which when thrown leftwardly by the foot as indicated, is intended to disengage the clutch as is well known. 6 indicates the brake lever shaft which is operated by the emergency hand brake for applying the brakes and is provided with the lever 7 at the end of which is the cam 8. At the lower end of the clutch pedal 5 is pivotally connected the rod 9, the other end of which is pivotally connected to the rocker member 10 pivoted at 11 to clutch lever shaft as shown and in the opposite end of which is secured the bolt 12 which may be retained by a locknut such as 13 said bolt being shown to advantage in Fig. 2, from which it will be seen that the head 14 of the bolt is tapered as indicated at 15 and is provided with a ball 16 free to rotate therein. For constructing a bolt of this character, it is only necessary to turn down the head of the bolt as shown and drill the hole in the centre thereof, after which the ball may be inserted and the rim of the hole closed in sufficiently to retain the same, so that the ball can freely rotate, after which the bolt may be screwed into the end of the rocker 10 as shown and the nut 13 applied for locking the same in position. This leaves the ball 16 in position to ride upon the face of the shoe or cam 8, from which it will be seen that when the emergency hand brake lever is operated, thereby rotating the shaft 6, the lever 7 rotating therewith causes the cam or shoe 8 to travel beneath the ball pointed end of the bolt, thereby rotating the rocker 10 upon the shaft 11 and operating the clutch pedal 5 through the medium of the connecting link 9 in the usual manner.

Instead of using a ball pointed bolt as described, a roller such as 17 may be secured in the end of a bolt such as 18 as shown in Fig. 3 or a threaded rod such as 19 may be provided with a bifurcated end 20 within which a roller such as 21 may be secured. In fact, various modifications may be made in the form and details of the bolt without departing from the spirit of the invention as claimed.

I claim:

1. In combination with the clutch lever and the cam with which the same co-operates, a ball-headed bolt having a threaded shank adapted to penetrate said clutch lever, said head having flat sides for turning the same within said lever, and a nut upon said shank for retaining said bolt in its adjusted position upon said lever.

2. In combination with the clutch lever and the cam with which the same co-operates in a motor vehicle, an anti-friction bearing comprising a bolt with a movable bearing at the head and a threaded shank adapted to pass through said clutch lever, and means for adjusting the same therein, said movable bearing adapted to ride upon the face of said cam.

3. In an automobile engine comprising a speed lever, a shoe on said lever, means to swing said lever, a clutch lever, a screw secured to said clutch lever, said screw having a recess formed therein, a ball journaled in said recess, and adapted to bear against said shoe.

In testimony whereof I hereunto affix my signature.

HENRY R. READ.